United States Patent [19]
Murphy

[11] 3,872,637
[45] Mar. 25, 1975

[54] MOBILE HOME CONSTRUCTION
[75] Inventor: Donald J. Murphy, Los Angeles, Calif.
[73] Assignee: Firstline Corporation, Los Angels, Calif.
[22] Filed: Apr. 12, 1974
[21] Appl. No.: 460,413

[52] U.S. Cl.................. 52/408, 52/220, 296/28
[51] Int. Cl............................................ B62d 29/00
[58] Field of Search.... 296/28 F, 28 R, 28 M, 23 R; 280/106 R, 106 T; 105/422, 423; 52/408, 219, 220; 161/93, 89

[56] References Cited
UNITED STATES PATENTS
| | | | |
|---|---|---|---|
| 3,188,694 | 6/1965 | Hammer | 296/28 R |
| 3,415,025 | 12/1968 | Walz | 52/299 |
| 3,497,417 | 2/1970 | Rizzo | 52/58 |
| 3,671,372 | 6/1972 | Hoffman | 161/89 |

Primary Examiner—John E. Murtagh
Attorney, Agent, or Firm—Nilsson, Robbins, Bissell, Dalgarn & Berliner

[57] ABSTRACT

A construction for a mobile home is disclosed in which a body (providing living quarters) incorporates a beamed floor structure which is supported by engagement with a frame which in turn supports running gear, e.g., wheels, for mobility. The construction includes a laminated undersiding faced with an imperforate film, e.g., plastic, which is backed by an insulation composite, including paper and asphalt, in which glass fibers are embedded. As disclosed, the fibers are generally equally spaced apart, however, are in closer proximity at areas of attachment to the floor structure. Ducts penetrating the undersiding are sealed thereto by plastic tape.

4 Claims, 5 Drawing Figures

PATENTED MAR 25 1975    3,872,637

MOBILE HOME CONSTRUCTION

BACKGROUND AND SUMMARY OF THE INVENTION

The evolution of the mobile home has been an outgrowth of increased labor costs and the progressively higher values of land in metropolitan areas. Generally, these units are constructed by factory techniques, and trailed to sites for somewhat-permanent installation. The use of factory labor and production techniques involves considerable economy over conventional on-site residential construction methods. As a consequence, a significant fragment of the growing housing requirements is being satisfied with mobile homes.

Typically, the running gear attached to a mobile home is employed only in the course of moving the unit from a factory to an installation site. However, according to conventional construction methods the wheels (and related running gear) are attached permanently to a steel frame which provides a primary support system for the composite unit. Again in accordance with convention, the steel frame carries a floor structure, formed of individual joists, upon which the body of the mobile home is constructed. The floor structure usually incorporates a bed of fiberglass insulation material. A sheet, generally called an undersiding, then is fixed between the floor structure and the frame to close the floor structure to the exterior.

The undersiding, for sealing the bottom of the mobile home, has some functions which are not readily apparent. For example, the fiberglass or other insulation bed in the floor, tends to attract vermin and as a result the undersiding is an important barrier against animal pests. Also, during wet weather, the insulation tends to become impregnated with moisture which substantially reduces its effectiveness. Accordingly, the undersiding should also serve as a seal against moisture. Additionally, during the period when the mobile home is in transit, the undersiding should be capable of repelling rocks and other road debris without puncture.

These desirable characteristics for an undersiding should be related to other considerations that are somewhat peculiar to mobile homes. Specifically, weight and economy are very significant in relation to construction materials in mobile homes. Consequently, it is important to provide an undersiding which is effective yet light in weight and economical to install. These considerations are somewhat interrelated in one aspect, that is the size of the largest area of undersiding which may be unsupported. Clearly, if unsupported areas of the undersiding must be limited to a few feet, the expense of construction is significantly increased. With a view toward these considerations, the present invention is directed to an improved mobile home construction utilizing a laminated undersiding and representing a substantial improvement over conventional structures.

BRIEF DESCRIPTION OF THE DRAWINGS

In the drawings, which constitute a part of this specification, an exemplary embodiment exhibiting various objectives and features hereof is set forth, specifically.

DESCRIPTION OF THE ILLUSTRATIVE EMBODIMENT

As required, a detailed illustrative embodiment of the invention is disclosed herein. The embodiment exemplifies the invention which may, of course, be embodied in other forms, some of which may be radically different from the illustrative embodiment as disclosed. However, the specific structural details disclosed herein are representative and provide a basis for the claims which define the scope of the present invention.

Figure 1:
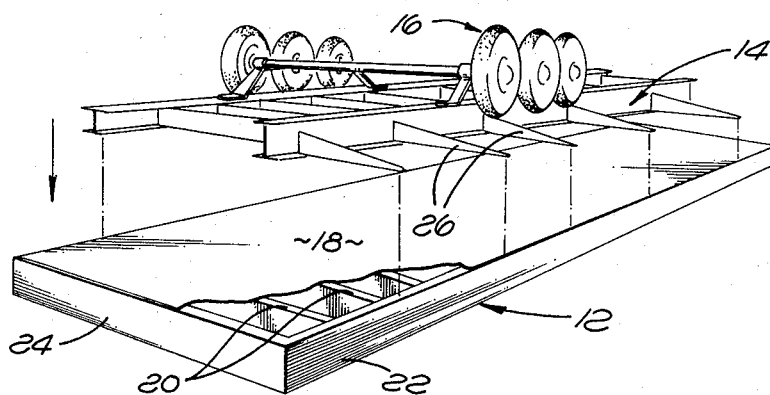
FIG. 1 is a fragmentary, sectional and partially-exploded view of the underside portion of a mobile home incorporating the construction of the present invention.

Referring initially to FIG. 1, a floor structure 12 is illustrated separated from a frame 14 incorporating a running gear 16. As depicted, the entire apparatus is inverted in order to illustrate the placement of the undersiding 18. Generally, the undersiding 18 is fixed between the floor structure 12 and the frame 14, serving as a bottom seal for the mobile home against moisture, vermin, and so on, as well as a barrier against stones and other flying road debris.

The floor structure 12 includes a substantial number of floor joists 20 including side perimeter joists 22 and end perimeter joists 24. Generally, the components of the frame 14, e.g., outriggers 26, are aligned into positional engagement with floor joists 20 so that when the floor structure 12 and the frame 14 are affixed together, a rigid, integrated unit is accomplished. As indicated above, the undersiding 18 is attached between these two structural components.

Figure 2:
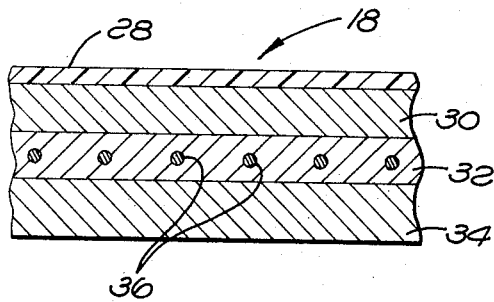
FIG. 2 is an enlarged fragmentary, sectional view through the undersiding incorporated in the structure of FIG. 1.
Figure 3:
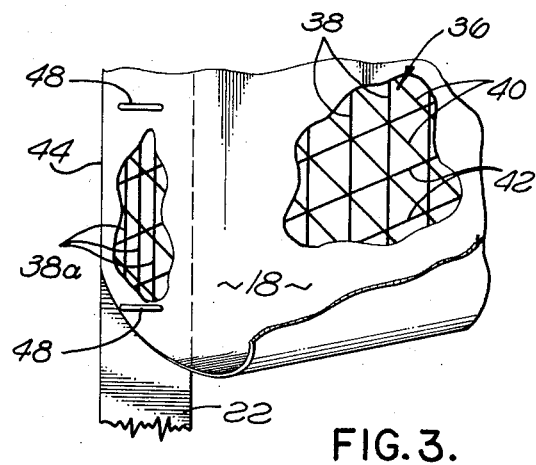
FIG. 3 is a fragmentary, plan view of a portion of the structure of FIG. 1 showing the undersiding.

Considering the undersiding 18 in somewhat greater detail, reference will now be had to FIG. 2. In essence, the undersiding 18 is laminated, being faced with black plastic, e.g. polyethylene, in the form of a film 28. A layer 30 of paper fiber, generally in an integral sheet, is bonded to the plastic 28 and backed by an asphalt layer 32, the opposed side of which is faced by another layer 34 of paper fiber which is similar to the first. The asphalt layer 32 carries a net 36 of embedded glass fibers. The configuration of the net 36 is somewhat-better illustrated in FIG. 3. In that regard, it may be seen that certain fibers 38 extend generally parallel to a side perimeter joist 22, while other sets of fibers 40 and 42 (substantially at right angles to each other) extend at offset, transverse angles to the fibers 38.

The central configuration of the tri-directional fiberglass re-enforcing net 36 affords considerable strength to the undersiding 18. However, the net is somewhat more complex at the edges of the undersiding 18, in relation to a technique for affixing the undersiding to the perimeter joist 22. Specifically, adjacent the edge 44 of the undersiding 18, the parallel fibers 38a are much closer than the central or internal fibers 38. For example, in one actual embodiment, the internal fibers 38 are separated by approximately five eighths of an inch while the edge fibers 38a are separated by approximately one quarter of an inch.

The close relationship between the edge fibers 38a is to provide an anchoring structure for staples 48 which pass through the undersiding 18 and are received in the perimeter joist 22. That is, each of the staples 48 spans three of the fibers 38a with the result that the likelihood of tearing or perforating the sealed relationship between the joist 22 and the undersiding 18 is considerably reduced. Of course, various other techniques as generally well known in the art may be employed to attach the undersiding 18 to the joist 22; however, the specific structure as disclosed herein affords considerable simplification and economy in that regard.

In view of the above structural description of the present construction, a complete understanding may now be accomplished by considering the detailed steps for accomplishing the construction. Accordingly, assume that a floor structure 12 (FIG. 1) has been completed and is supported in an inverted position. The undersiding 18 is normally provided in a roll form and, accordingly, a length is unrolled over the floor structure 12 with the black plastic side facing upward as illustrated in FIG. 1. A length of the undersiding material is then severed from a roll and is aligned with the perimeter joists 22 and 24. As indicated above, various fastening techniques may be employed to affix the undersiding to the floor structure 12; however, in accordance herewith, stapling methods are somewhat preferable in the interest of economy. Accordingly, the excess material (extending over the perimeter joists) is either turned downward or folded in a double thickness so that the undersiding 18 aligns with the floor joist. Next, staples 48 (FIG. 3) are set through the undersiding 18 so as to affix the undersiding to the joist 22. In an exemplary structure, staples 48 of one inch width have been determined to be effective when spaced apart by two or three inches.

When the undersiding 18 is fully affixed to the floor structure 12, the next step may involve repairs and sealing openings around plumbing and other ducts. It is an important characteristic of the present construction that polyvinylchloride tape may be used to effectively and permanently repair the undersiding 18. That is, in view of the imperforate exposed surface provided by the plastic film 28 (FIG. 2) an effective and durable bond may be made with plastic tape.

Figure 4:
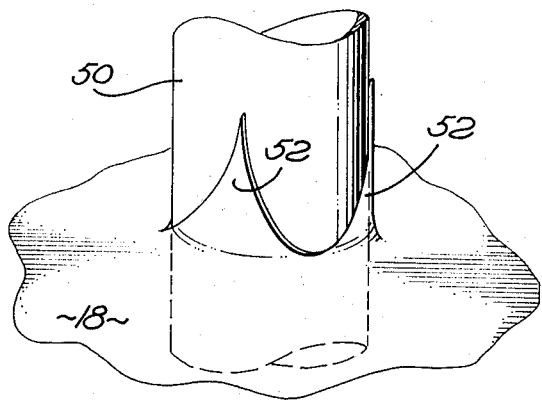
FIGS. 4 and 5 are fragmentary, perspective views illustrative of detailed construction in the unit of FIG. 1.
Figure 5:
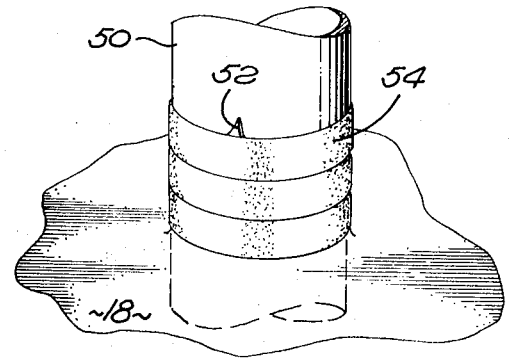

A consideration that is somewhat related to the repairability of the undersiding 18 involves sealing the undersiding around ducts. Specifically, conventional practice involves plumbing, electrical and other ducts which pass through the undersiding in order to provide service to the mobile home. Generally, various forms of undersiding which have been employed in the past have presented a difficult problem with regard to sealing such ducts. Referring to FIG. 4, the undersiding 18 is illustrated to be pierced by a duct 50. Specifically, for example, a cross is cut in the undersiding 18 providing flaps 52 to accommodate the passage of the duct 50. Thereafter, vinyl tape 54 is applied over the flaps 52 as illustrated in FIG. 5 to produce an effective and substantially total closure of the undersiding 18 with the duct 50.

Upon the complete installation of the undersiding 18, the frame 14 (FIG. 1) is lowered onto the undersiding 18 for support by the floor structure 12. These elements are then affixed together as indicated above after which the configuration depicted in FIG. 1 is inverted so that the body of the mobile home may be completed on the floor structure 12.

The construction as disclosed herein has been determined to be particularly effective with regard to a number of considerations. Specifically, the undersiding 18 is very light in weight compared with heavy bottom boards or other fiber structures. The fiberglass net 36 is effective in providing sufficient strength to repel flying objects and additionally affords an effectively reenforced sheet to simplify the step of fixing the sheet to the floor structure. The carrier for the fiberglass net 36 is effectively provided by the emulsion or asphalt layer 32 which also serves to repel vermin. Body and insulation are also provided by the asphalt layer 32 in combination with the paper fiber layers 30 and 34. The composite is accordingly effective as well as durable, the film 28 serving to seal the interior against moisture.

The light weight of the undersiding 18 affords advantages apart from total-weight considerations. In that regard, the undersiding 18 may involve relatively large, e.g. to 8 foot lengths, of unsupported undersiding. Such a capability results in further economy both in construction and materials.

Although the construction of the present invention has been described in complete detail, it is apparent that various equivalent materials and techniques may be employed in accordance with the concepts disclosed herein. Consequently, the scope hereof shall be as defined in the claims as set forth below.

What is claimed is:

1. A mobile home construction comprising:
 a body including a beamed floor structure of wooden floor joists;
 a frame of integral steel-beam configuration, as for receiving wheels, said frame affixed to support said body by engaging said beamed floor structure; and
 a composite flexible laminated undersiding disposed between said beamed floor structure and said frame affixed to said frame, said undersiding including, in bonded relationship, a plastic imperforate film, at least one layer of paper-like fiber, a matrix of glass fibers, and an asphalt-like layer for receiving said glass fibers and bonded with said layer of paper-like fiber, to provide a composite, said composite being affixed to provide said imperforate film facing said frame.

2. A mobile home construction according to claim 1 further including a second layer of paper-like fiber disposed to contact said asphalt-like layer on a side opposed to said one layer of paper-like fiber.

3. A construction according to claim 1 wherein said undersiding includes a set of spaced-apart fibers extending substantially aligned with said beams, said fibers in said set being in closer proximity than other fibers.

4. A construction according to claim 1 further including duct means extending through said undersiding into said body, and tape wrapping affixing said undersiding to said duct means.

* * * * *